United States Patent
Yao

(10) Patent No.: US 6,476,959 B2
(45) Date of Patent: Nov. 5, 2002

(54) OPTICAL PULSE SYNTHESIS USING BRILLOUIN SELECTIVE SIDEBAND AMPLIFICATION

(75) Inventor: X. Steve Yao, Diamond Bar, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/758,551

(22) Filed: Jan. 10, 2001

(65) Prior Publication Data

US 2001/0024317 A1 Sep. 27, 2001

Related U.S. Application Data

(60) Provisional application No. 60/175,991, filed on Jan. 10, 2000.

(51) Int. Cl.[7] .................................................. H01S 3/30
(52) U.S. Cl. ....................................... 359/334; 359/347
(58) Field of Search ................................. 359/334, 348

(56) References Cited

U.S. PATENT DOCUMENTS

| | | |
|---|---|---|
| 3,569,715 A | 3/1971 | Horning |
| 4,700,150 A | 10/1987 | Hall et al. |
| 4,796,264 A | 1/1989 | Suzuki |
| 5,126,876 A | 6/1992 | O'Meara |
| 5,200,964 A | 4/1993 | Huber |
| 5,325,380 A | 6/1994 | Clendening et al. |
| 5,343,324 A | 8/1994 | Le et al. |
| 5,379,147 A | 1/1995 | Cook |
| 5,379,309 A | 1/1995 | Logan, Jr. |
| 5,390,204 A * | 2/1995 | Yessik et al. .................. 372/13 |
| 5,400,417 A | 3/1995 | Allie et al. |
| 5,495,359 A | 2/1996 | Gertel et al. |
| 5,532,857 A | 7/1996 | Gertel et al. |
| 5,640,406 A | 6/1997 | Injeyan et al. |
| 5,654,818 A | 8/1997 | Yao |
| 5,723,856 A | 3/1998 | Yao et al. |
| 5,777,778 A | 7/1998 | Yao |
| 5,796,510 A | 8/1998 | Yao |
| 5,917,179 A | 6/1999 | Yao |
| 5,929,430 A | 7/1999 | Yao et al. |

FOREIGN PATENT DOCUMENTS

| | | |
|---|---|---|
| WO | WO00/44074 | 7/2000 |
| WO | WO00/45213 | 8/2000 |

OTHER PUBLICATIONS

Kovalev et al. "Diffraction limited output from a cw Nd: YAG MOPA with a fibre phase conjugate SBS mirror." LEOS 99 IEEE Lasers and Electro–Optics Scociety 1999. Nov. 8–11, 1999 vol. 2 pp. 912–913.*

Pepper et al. "Nonlinear optical phase conjugation" Sep. 1991. IEEE Circuits and Devices Mag. vol. 7 issue 5. pp. 21–34.*

Offenberger et al. "Experimental and Modeling Studies of a Brillouin Amplifier." Jan. 1993. IEEE Journal of Quantum Electronics. vol. 29 No. 1.*

Kinsel, Tracy S. "A Stabilized Mode–Locked Nd:YA1G Laser Using Electronic Feedback" IEEE Journal of Quantum Electronics, vol. QE–9 (1), Jan. 1973.

Takada et al. "30GHz Picosecond Pulse Generation from Actively Mode–Locked Erbium–Doped Fibre Laser." Electronics Letters, Feb. 1, 1990, vol. 26(3).

(List continued on next page.)

*Primary Examiner*—Thomas H. Tarcza
*Assistant Examiner*—Stephen Cunningham
(74) *Attorney, Agent, or Firm*—Fish & Richardson P.C.

(57) ABSTRACT

Techniques for producing optical pulses based on Brillouin selective sideband amplification by using a common modulation control signal to modulate both a signal beam to produce multiple sideband signals and a single pump beam to produce multiple pump beams.

40 Claims, 6 Drawing Sheets

OTHER PUBLICATIONS

Cowle et al. "Single–Frequency Travelling–Wave Erbium–Doped Fibre Loop Laser." Electronics Letters, Jan. 31, 1991. vol. 27 No. 3.

Grudinin et al. "Nd:YAG Laser Pumped Picosecond $Yb^{3+}/Er^{3+}$ Fibre Laser." Electronics Letters, Apr. 9, 1992, vol. 28 No. 8.

Kafka et al. "Picosecond and Femtosecond Pulse Generation in a Regeneratively Mode–Locked Ti:Sapphire Laser." IEEE Journal of Quantum Electronics. vol. 28(10), Oct. 1992.

Harvey et al. "Harmonically mode–locked fiber ring laser with an internal Fabry–Perot stabilizer for soliton transmission." Optics Letters, vol. 18, No.2., Jan. 1993.

Nagarajan et al. "Resonantly Enhanced Semiconductor Lasers for Efficient Transmission of Millimeter Wave Modulated Light." IEEE Photonics Technology Letters, vol. 5 (1), Jan. 1993.

Sugawa et al. "1–6 ps Pulse generation from a 1–3$\mu$m $Pr^{3+}$–doped fluoride fibre laser." Electronics Letters, vol. 29(10), May 1993.

Yao et al. "High frequency optical subcarrier generator." Electronics Letters vol. 30(18), Sep. 1994.

Nakazawa et al. "Ultrastable harmonically and regeneratively modelocked polarisation–maintaining erbium fibre ring laser." Electronics Letters vol. 30(19), Sep. 1994.

Tiemeijer et al. "27–db gain unidirectional 1300–nm polarization–insensitive multiple quantum well laser amplifier module." IEEE Photonics Technology Letters vol. 6(12), Dec. 1994.

Yoshida et al. "20GHz, 1.8ps pulse generation from a regeneratively modelocked erbium–doped fibre laser and its femotosecond pulse compression." Electronics Letters vo. 31(5), Mar. 1995.

Yao et al. "A high–speed photonic clock and carrier regenerator." TDA Progress Report 42–121, May 1995.

Yao et al. "Light induced microwave oscillator." Submitted to JOSA–B on Oct. 12, 1995.

Yao et al. "A high speed photonic clock and carrier recovery device." Submitted to IEEE Photonics Technology Letters on Oct. 30, 1995.

Yao et al. "Converting light into spectrally pure microwave oscillation." Optics Letters vo. 21 (7), Apr. 1996.

Nakazawa et al., "Direct generation of a 50fs, 10HGz pulse train from a regenerativly mode–locked fibre laser with multiple harmonic modulation." Electronics Letters, vol. 32(14), Jul. 1996.

Yao et al. "Light–induced microwave oscillator for photonic systems." IEEE Journal of Quantum Electronics, vol. 32(7), Jul. 1996.

* cited by examiner

OPTICAL PULSE SYNTHESIS USING BRILLOUIN SELECTIVE SIDEBAND AMPLIFICATION

This application claims the benefit of U.S. Provisional Application No. 60/175,991, filed Jan. 10, 2000.

ORIGIN OF THE INVENTION

The invention described herein was made in the performance of work under a NASA contract, and is subject to the provisions of Public Law 96-517 (35 U.S.C. 202) in which the Contractor has elected to retain title.

BACKGROUND

This application relates to opto-electronic devices and techniques for generating optical pulses, and more particularly, to optical pulse generation and synthesis based on Brillouin selective sideband amplification.

Optical waves can be used as carriers and modulated by using optical modulators to carry radio frequency (RF) signals. This combination of RF technology and photonic technology can be used to achieve certain advantages and provide new opto-electronic devices and applications in signal processing and communications.

One class of such opto-electronic devices use optical fibers or other optical media to optically amplify a RF signal superimposed on an optical carrier via Brillouin selective sideband amplification. This is described in U.S. Pat. 5,917,179 to Yao. This process uses a nonlinear optical process in which an optical pump beam can be injected into a Brillouin optical medium to produce an acoustic grating moving in the direction of the pump beam based on the electrorestrictive effect. This grating interacts with the pump beam to produce a backscattered Brillouin optical wave at a frequency less than that of the pump beam. When a narrowband seed signal, which is in the opposite direction of the pump wave and at the same frequency of the Brillouin optical wave, is injected into the medium, the interaction between the seed signal and the pump wave can significantly enhance the acoustic grating and convert the spontaneous Brillouin scattering into a stimulated Brillouin scattering (SBS). The stimulated back scattering light adds up in phase with the seed signal to produce an amplified seed signal. This Brillouin amplification can be used to implement a signal amplification scheme to selectively amplify a RF sideband in a modulated optical signal.

One application of this Brillouin selective sideband amplification is to selectively amplify multiple desired RF sidebands to generate optical pulses based on the interference of the amplified RF sidebands in the time domain. U.S. patent application Ser. No. 09/006,845 filed on Jan. 14, 1998 by Yao discloses a system where multiple pump beams from multiple pump lasers are used to amplify selected RF sidebands that are in phase with one another to generate optical pulses.

SUMMARY

The systems and techniques of the present disclosure include a system that uses a common RF signal to modulate both a signal beam to produce multiple RF sideband signals and a single pump beam to produce multiple pump beams. RF sideband signals and multiple pump beams are sent into a Brillouin medium in opposite directions. The frequencies of the signal beam and the single pump beam are selected relative to each other so that the Brillouin signals generated by the pump beams overlap with the RF sideband signals to effectuate Brillouin selective sideband amplification of RF sideband signals.

The frequency of the single pump beam may be actively controlled to maintain the proper frequency overlap between the RF sideband signals and the respective Brillouin signals by adjusting a single pump laser that produces the single pump beam. In addition, the system may place the Brillouin medium between a polarizing beam splitter and a Faraday reflector to reduce the system sensitivity to the polarization states of the signal beam and the single pump beam and to double the Brillouin gain by passing the RF sideband signals and the pump beams through the Brillouin medium twice.

DETAILED DESCRIPTION

Pulse generation through synthesis of discrete frequency bands in the time domain in general requires that the frequency bands be at certain frequency spacings and phase values with respect to one another. Therefore, in the scheme of Brillouin selective sideband amplification, when multiple pump lasers are used to generate multiple pump beams to produce simulated Brillouin signals for amplifying selected RF sidebands in a signal beam, the different pump lasers need to be phase locked with respect to one another so that the pump frequencies are at selected values and are stabilized with respect to one another. For certain applications, it may be advantageous to use a single pump laser to produce the multiple pump beams which can be automatically locked in phase with one another. A common RF source may be used to modulate both a single pump beam from the pump laser to produce the multiple pump beams and a signal beam to produce the RF sideband signals to be amplified. This can eliminate the laser locking mechanism for the system with multiple pump lasers and hence can significantly simplify the optical and electronic structure of the system and improve the operational reliability.

In addition, under this scheme of using the common RF source, the frequency spacing between the Brillouin signals produced by the pump beams is equal to the frequency spacing of the RF sideband signals. Hence, when one of the Brillouin signals overlaps with one of the RF sideband signals for Brillouin amplification, the remaining Brillouin signals automatically overlap with other RF sideband signals. There is no need to perform separate frequency adjustment to overlap frequencies of different Brillouin signals to frequencies of different RF sideband signals as in the system with multiple pump lasers.

Figure 1:
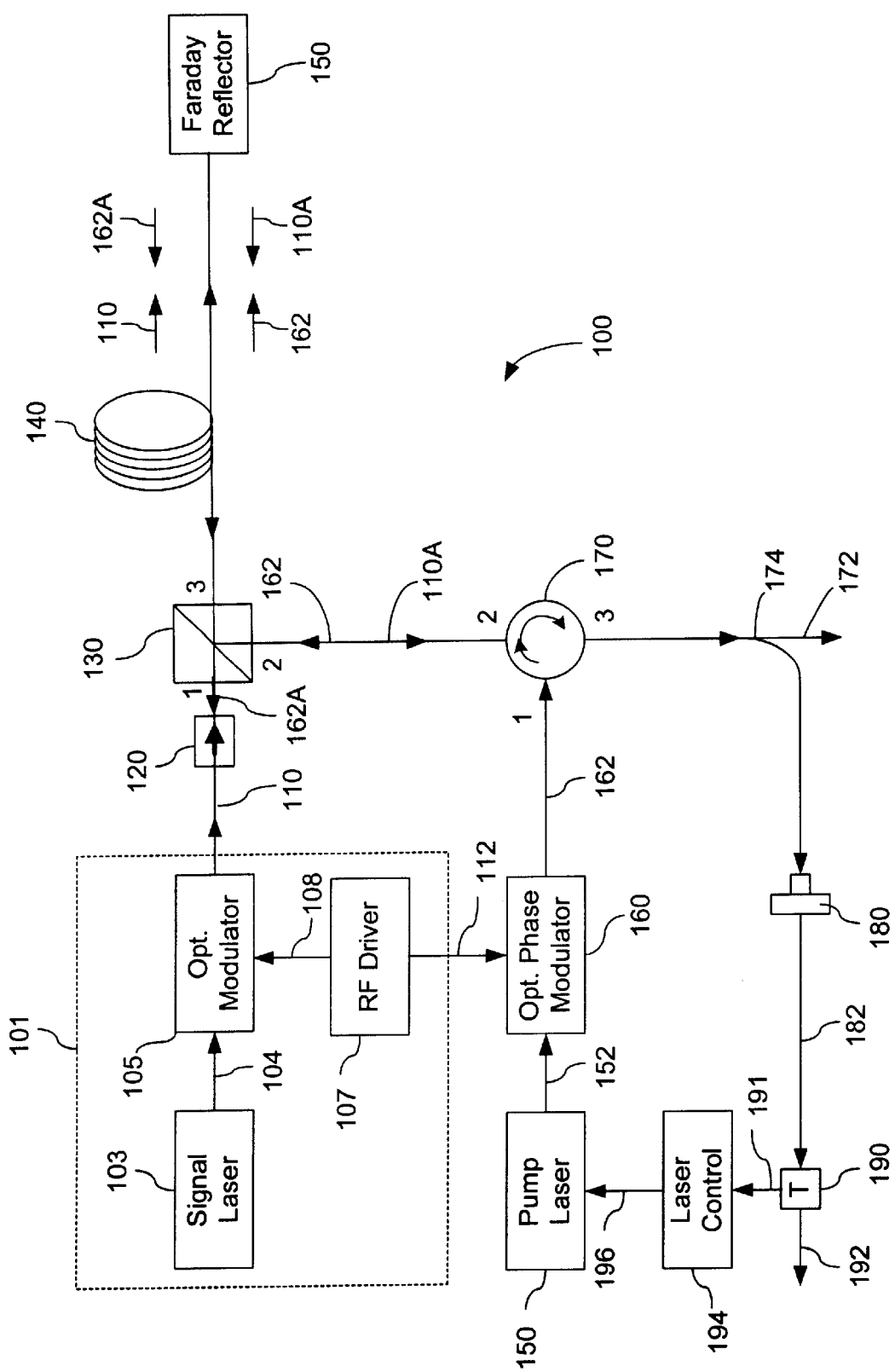
FIG. 1 shows on embodiment of a system that generates optical pulses based on Brillouin selective sideband amplification.
Figure 2:
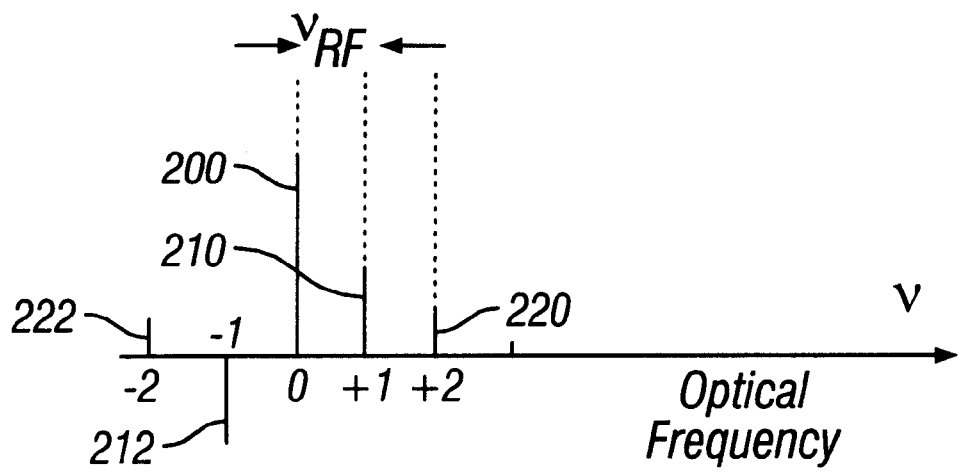
FIG. 2 shows an exemplary spectrum of a signal beam modulated with sideband signals.

FIG. 1 shows an exemplary optical pulse generator 100 based on Brillouin selective sideband amplification according to one embodiment of the present disclosure. An optical signal generator 101 is used to produce an optical signal 110 at an optical carrier frequency $v_0$ that is modulated at a RF frequency $v_{RF}$ to carry multiple RF sideband signals. FIG. 2 shows an example of the spectrum of the optical signal 110 which includes the baseband signal 200 at $v_0$, and four RF sideband signals: the first order RF sideband signals 210 at $v_0+v_{RF}$ and 212 at $v_0-v_{RF}$, and the second order RF sideband signals 220 at $v_0+2V_{RF}$ and 212 at $v_0-2V_{RF}$. The example shown is a phase modulated signal where the odd-number order RF sideband signals are out of phase by 180 degrees such as the signals 210 and 212.

The signal generator 101 is implemented in the illustrated embodiment to include a CW signal laser 103, a signal optical modulator 105, and a RF driver 107. The signal laser 103 produces a signal beam 104 at the optical carrier frequency $v_0$ and may be tunable to change $v_0$ if needed. The signal optical modulator 105 modulates the signal beam 104 from the laser 103 to produce the signal 110. The signal optical modulator 105 may be an amplitude modulator or a phase modulator. The phase modulator may be preferred in some applications because it is relatively simple to operate and can be designed to have low optical loss and operate without bias. The RF driver 107 is a device that generates a RF signal 108 to control the optical modulator 105 which modulates the signal beam 104 at the RF frequency $v_{RF}$.

A Brillouin optical medium 140, such as a single-mode fiber loop, is provided to receive the signal beam 110 from the signal generator 101. A CW pump laser 150 and a pump optical modulator 160 are used to generate a pump beam 162 with multiple pump signals by modulating a single pump beam 152 at a pump frequency $v_P$ from the pump laser 150. Similar to the signal optical modulator 105, the pump optical modulator 160 may be either a phase modulator or an amplitude modulator. In addition, the same RF driver 107 may be used to control the pump modulator 160 which modulates the pump beam 152 at the same RF frequency $v_{RF}$ to produce multiple pump signals in the pump beam 162. A pump modulation control signal 112 is shown to be generated by the RF driver 107 for controlling the operation of the pump modulator 160. This signal 112 is essentially a copy of the signal 108.

Figure 3:
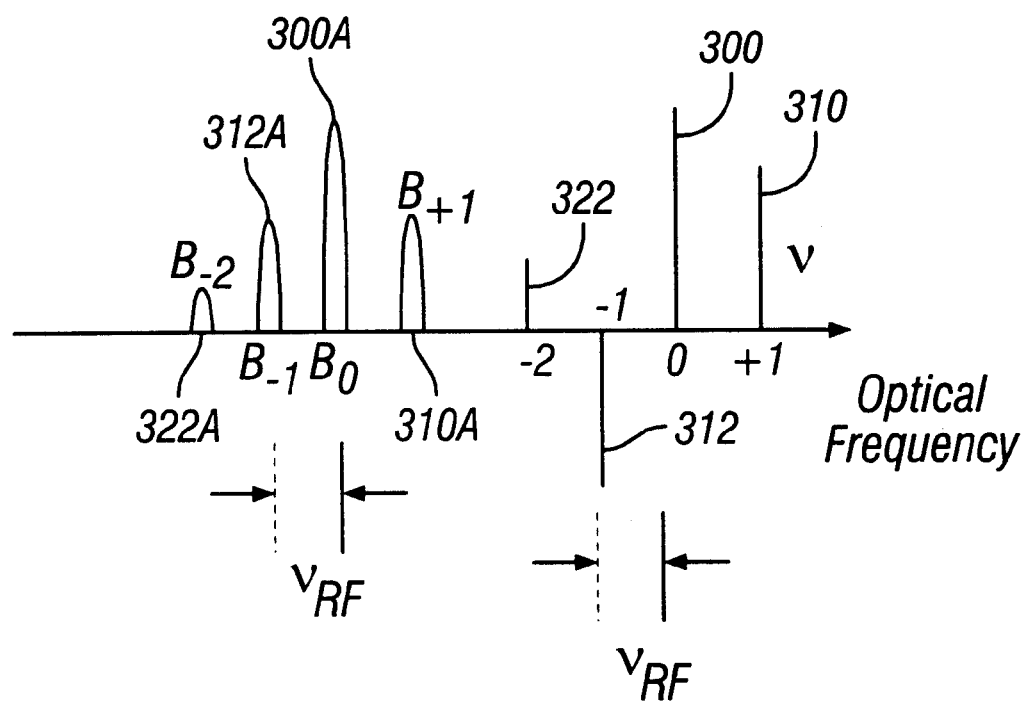
FIG. 3 shows an exemplary spectrum of a pump beam modulated with sideband pump signals.

FIG. 3 shows an example of the spectrum of the pump beam 162 produced by a phase modulator, which includes the baseband pump signal 300 at $v_P$, and three RF sideband pump signals: the first order RF sideband pump signals 310 at $v_P+v_{RF}$ and 312 at $v_P-v_{RF}$, and the second order RF sideband pump signal 312 at $v_P-2v_{RF}$. Each pump signal in the pump beam 160 interacts with the Brillouin medium 140 to produce a down-shifted Brillouin signal due to the Doppler effect. Hence, four Brillouin signals 310A, 300A, 312A, and 322A are generated by the pump signals 310, 300, 312, and 322, respectively. In some commercial single-mode fibers such as the Corning SMF-28, the frequency down shift for a pump beam at 1550 nm is about 10 GHz and is about 12.8 GHz for a pump beam at 1319 nm.

Brillouin selective sideband amplification occurs when the following two conditions are met if the pump signals exceed the Brillouin threshold. First, the signal beam 110 propagates in the opposite direction of the pump beam 162 and overlaps with the pump beam 162 in the Brillouin medium 140. Second, frequencies of selected signals in the signal beam 110 overlap with frequencies of the Brillouin signals within the Brillouin signal bandwidth. In the example shown in FIGS. 2 and 3, the Brillouin signals 300A, 312A, and 322A are shown to spectrally overlap with the signals 220, 210, and 200, respectively. This can be achieved by tuning either the frequency $v_0$ of the signal laser 103 or the frequency $v_P$ of the pump laser 150 to overlap one Brillouin signal with a respective signal in the signal beam 110. The spectral alignment of the remaining Brillouin signals and other signals in the signal beam 110 is automatically achieved since spectral spacing between two adjacent Brillouin signals and the spectral spacing between two adjacent signals in the signal beam 110 are approximately equal to the RF frequency $v_{RF}$.

In the above example, the signals 220, 210, and 200 are amplified by different amounts because the amplitudes of the Brillouin signals 300A, 312A, and 322A are different. Since the same RF source 107 is used to modulate the signal beam 104 and the pump beam 152, the relative strengths of the pump signals 300, 312, and 322 are substantially the same as the relative strengths of the signals 200, 210, and 220. Since the strengths of the Brillouin signals 300A, 312A, and 322A are proportional to the strengths of the pump signals 300, 312, and 322, the amplified signals 200, 210, and 220 have approximately the same signal strength. When a different spectral alignment is used, different amplified signals strengths of the signals 200, 210, and 220 can be achieved. For example, the Brillouin signal 312A may be used to amplify the signal 200, the Brillouin signal 300A may be used to amplify the signal 210, and the Brillouin signal 310A may be used to amplify the signal 220. This provides a mechanism to control the relative signal strengths of the amplified signals and hence to control the shape of the optical pulse in the time domain. The relative phase values of the signals in the phase-modulated signal beam 110 may also be used to control the shape of the pulse. In addition, the number of selectively amplified signals in the signal beam 110 may also be used to control the pulse shape. The pulse repetition rate of such pulses is the RF modulation frequency $v_{RF}$. Hence, the output frequency of the RF driver 107 may be adjusted to change the pulse repetition rate.

Referring back to FIG. 1, the system 100 uses a polarization beam splitter (PBS) 130 and a Faraday reflector 150 to couple the signal beam 110 and the pump beam 162 into the Brillouin medium 140 to overlap with each other and to propagate in opposite directions. The PBS 130 is placed at the input end of the Brillouin medium 140 to receive both the signal beam 110 and the pump beam 162 at two different ports 1 and 2, respectively. The signal beam and the pump beam are linearly polarized and are orthogonal to each other when entering the PBS 130. The PBS 130 combines and output the signal and pump beams along the same direction at a third port 3. For example, the polarization of the signal beam 110 is initially linear and is set at a direction along the passing axis of the PBS 130 so that the signal beam 110 transmits through the PBS 130 to enter the medium 140. The initial polarization of the pump beam 162 is also linear but is orthogonal to the initial polarization of the signal beam 110 so that the pump beam 162 is reflected by the PBS 130 to enter the medium 140 in the same direction of the transmitted signal beam 110. Alternatively, the system 100 may be arranged so that the PBS 130 reflects the signal beam 110 into the medium 140 while transmitting the pump beam 162 to the medium 140.

The Faraday reflector 150 is placed at the other end of the medium 140 to reflect a beam and to rotate the polarization by 90 degrees. This Faraday reflector 150 may be implemented by placing a 45-degree Faraday rotator in front of a reflector. Hence, the input signal beam 110 is reflected back by the Faraday reflector 150 as a reflected signal beam 110A which has a polarization orthogonal to the input polarization of the input signal beam 110. Similarly, the input pump beam 162 is reflected back by the Faraday reflector 150 as a reflected pump beam 162A which has a polarization orthogonal to the input polarization of the input pump beam 162.

Notably, the polarization of reflected pump beam 162A has the same polarization as the input signal beam 110 in the medium 140 and propagates in the opposite direction of the input signal beam 110. In addition, the polarization of a Brillouin signal generated by the reflected pump beam 162A is the same as the polarization of the input signal beam 110. Therefore, a signal in the input signal beam 110, when spectrally overlapped with this co-propagating Brillouin signal produced by the reflected pump beam 162A, can be amplified in the medium 140. Upon reflection and polarization rotation by the Faraday reflector 150, this amplified signal 110 becomes a part of the reflected signal beam 110A and is amplified for the second time in the medium 140 by another Brillouin signal at the same frequency and propagating in the same direction that is produced by the input pump beam 162. The reflected signal beam 110A, upon entering the PBS 130, no longer transmits through the PBS 130 to go back to the signal generator 101 but is reflected by the PBS 130 to the opposite direction of the input pump beam 162. Meanwhile, the reflected pump beam 162A transmits through the PBS 130 to the opposite direction of the input signal beam 110. An optical isolator 120 may be positioned in the optical path of the input signal beam 110 between the signal generator 101 and the PBS 130 to attenuate the reflected pump beam 162A. The system 100 uses an optical circulator 170 to couple the pump beam 162 from the optical modulator 160 to the PBS 130 and to direct the reflected signal beam 110A, i.e., optical pulses, to an output port 172.

Therefore, a number of advantages can be achieved with the above arrangement of the PBS 120, the Brillouin medium 140, and the Faraday reflector 150. Both the signal beam 110 passes through the medium 140 twice and hence is amplified by the Brillouin process twice. This effectively doubles the Brillouin gain for a given length of the medium 140. The polarization scheme in the arrangement provides a mechanism to separate the amplified, reflected signal beam 110A from the reflected pump beam 162A.

In addition, the polarization scheme also ensures that counter-propagating beams in the medium 140 have the same polarization for efficient Brillouin amplification even if the medium 140 may change the polarization states of the signal beam 110 and the pump beam 162. When a single-mode fiber loop is used as the medium 140, the arrangement of the system 100 can be particularly advantageous in overcoming the sensitivity of the Brillouin amplification process on the polarization states of the pump and signal beams because the fiber imperfections, variations in temperature or stress in the fiber medium 140 can cause the polarization of light to change or fluctuate.

As described above, only a single frequency control of the frequency difference between the signal carrier frequency $v_0$ and the pump frequency $v_P$ is needed to ensure the frequency overlap of different pump signals and different signals due to the use of a common RF source 107 for modulating the signal and pump beams 104 and 152. Another aspect of the present disclosure is to implement a laser feedback control mechanism in either the signal laser 103 or the pump laser 150 to automatically lock the frequency difference between the two lasers 103 and 150 to prevent a relative frequency draft and to achieve Brillouin amplification in selected signals in the signal beam 110. FIG. 1 shows an exemplary laser feedback control for the pump laser 150.

This laser control mechanism uses an optical coupler 174 to split part of the reflected signal beam 110A as an optical feedback signal. A photodetector 180 is used to convert the optical feedback signal into a detector signal 182. The laser control mechanism operates based on the fact that when a signal in the signal beam 110 is aligned with a respective Brillouin signal in frequency, other selected signals the signal beam 110 are also aligned with their respective Brillouin signals in frequency and therefore the received DC signal in the detector signal 182 should be significantly increased or maximized. To separate this DC signal from the detector signal 182, a RF circuit element 190 such as bias tee is used to separate the DC and low frequency components 191 from high frequency components 192 in the detector signal 182. A laser control unit 194 is used to control the frequency of the pump laser 150 in response to the signal 191 so that the signal level of the 191 can be maximized. Alternatively, the signal laser 103 may be similarly controlled.

The system 100 in FIG. 1 has been tested to demonstrate its operation and performance. Two diode-pumped YAG lasers at about 1319 nm were used as the signal laser 103 and the pump laser 150. Two phase modulators were used as the signal and pump modulators to produce the sideband signals to be synthesized as shown in FIG. 2 and the pump signals in FIG. 3. A RF circuit was used as the RF driver 107 to produce signals 108 and 112 at about 7.7 GHz. A single-mode fiber loop of about 4 km in length was used as the Brillouin medium 140. The total pump power entering the 4-km fiber loop 140 was about 30 mW. A super-cavity spectrum analyzer was used to measure the spectrum of the optical output at the port 172.

Figure 4A:
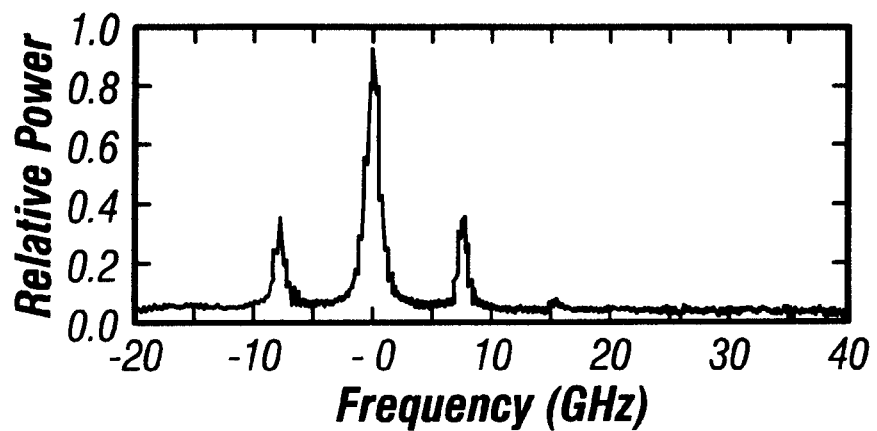
FIGS. 4A, 4B, and 4C show measured output spectra of the system in FIG. 1 under different operating conditions.
Figure 4B:
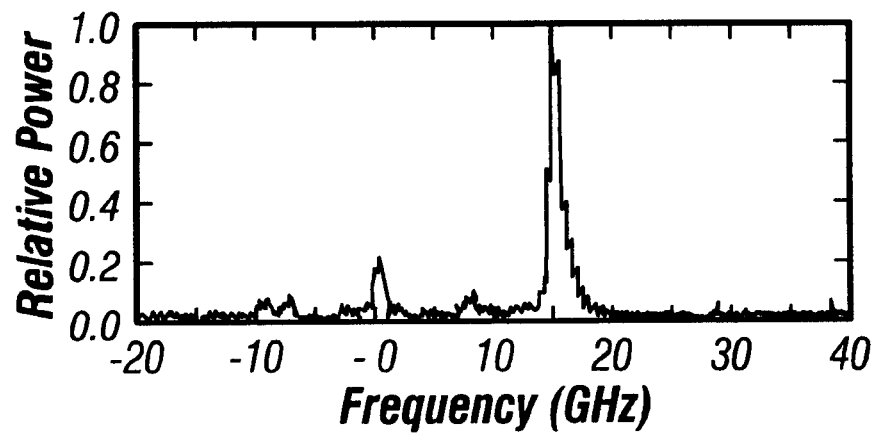
Figure 4C:
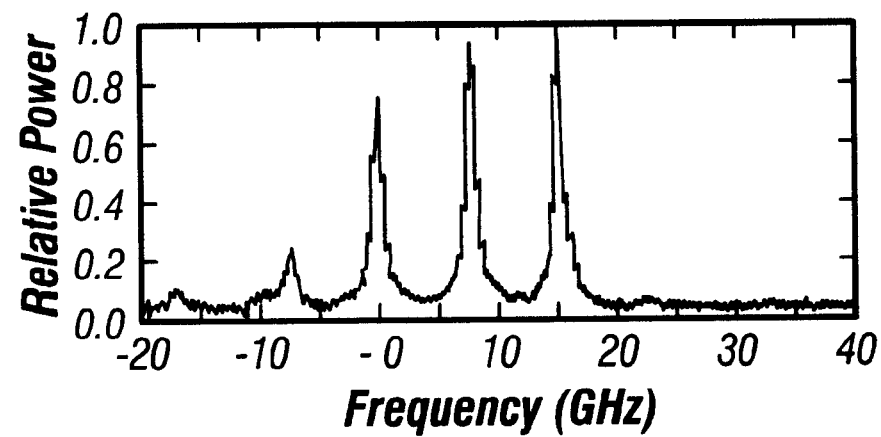

FIGS. 4A, 4B, and 4C show measured optical spectra of the optical output at the output port 172 under three different conditions. In FIG. 4A, the signal laser 103 was on and the pump laser 150 was turned off. Hence, the spectrum represents the modulated signals in the signal beam 110. In FIG. 4B, the pump laser 150 was turned on but was not modulated. Hence, only a single pump signal was in the fiber loop 140 and was tuned to selectively amplify the +2 modulation sideband of the signal beam 110. In FIG. 4C, the pump beam was phase modulated with the 7.7-GHz RF source to selectively amplify the 0, +1, and +2 modulation sidebands of the signal beam 110 and a pulse train with a repetition rate of 7.7 GHz was generated. Different pulse shape were also obtained by tuning the pump laser 150 to amplify different signal sidebands in the signal beam 110 and adjusting the modulation depth of the pump beam 162.

FIG. 1 only shows one implementation of the signal generator 101. A number of other implementations for the signal generator 101 may also be used. For example, an opto-electronic oscillator (OEO) may be used to produce the signal beam 110 with modulated sidebands and the RF control signal 112 for controlling the pump optical modulator 160.

An OEO may include an electrically controllable optical modulator and at least one active opto-electronic feedback loop that comprises an optical part and an electrical part interconnected by a photodetector. The opto-electronic feedback loop receives the modulated optical output from the modulator and converted it into an electrical signal to control the modulator. The loop produces a desired delay and feeds the electrical signal in phase to the modulator to generate and sustain both optical modulation and electrical oscillation in the RF range when the total loop gain of the active opto-electronic loop and any other additional feedback loops exceeds the total loss. OEOs use optical modulation to produce oscillations in frequency spectral ranges that are outside the optical spectrum, such as in RF and microwave frequencies. The generated oscillating signals are tunable in frequencies and can have narrow spectral linewidths and low phase noise in comparison with the signals produced by other RF and microwaves oscillators. Some examples of OEOs are disclosed in U.S. Pat. Nos. 5,723,856, 5,777,778, 5,917,179, and 5,929,430, and U.S. patent application Ser. No. 09/491,988 filed January 2000.

FIGS. SA, SB, and 5C show signal generators 101 based on OEOs in three different configurations. FIG. SA shows a dual-loop OEO in which an optical delay element 501 or 502 such as a fiber loop or an optical resonator is included in each opto-electronic feedback loop 510 or 520. The optical resonator as a delay element in this and other OEOs may be a Fabry-Perot resonator, a fiber ring resonator, or a microsphere resonator operating in whispering-gallery modes. Alternatively, one of the feedback loops may be replaced with an electrical feedback loop. The RF control signal 112 for controlling the pump optical modulator 160 may be generated by using a RF coupler to split a portion of the RF feedback signal 108.

Figure 5A:
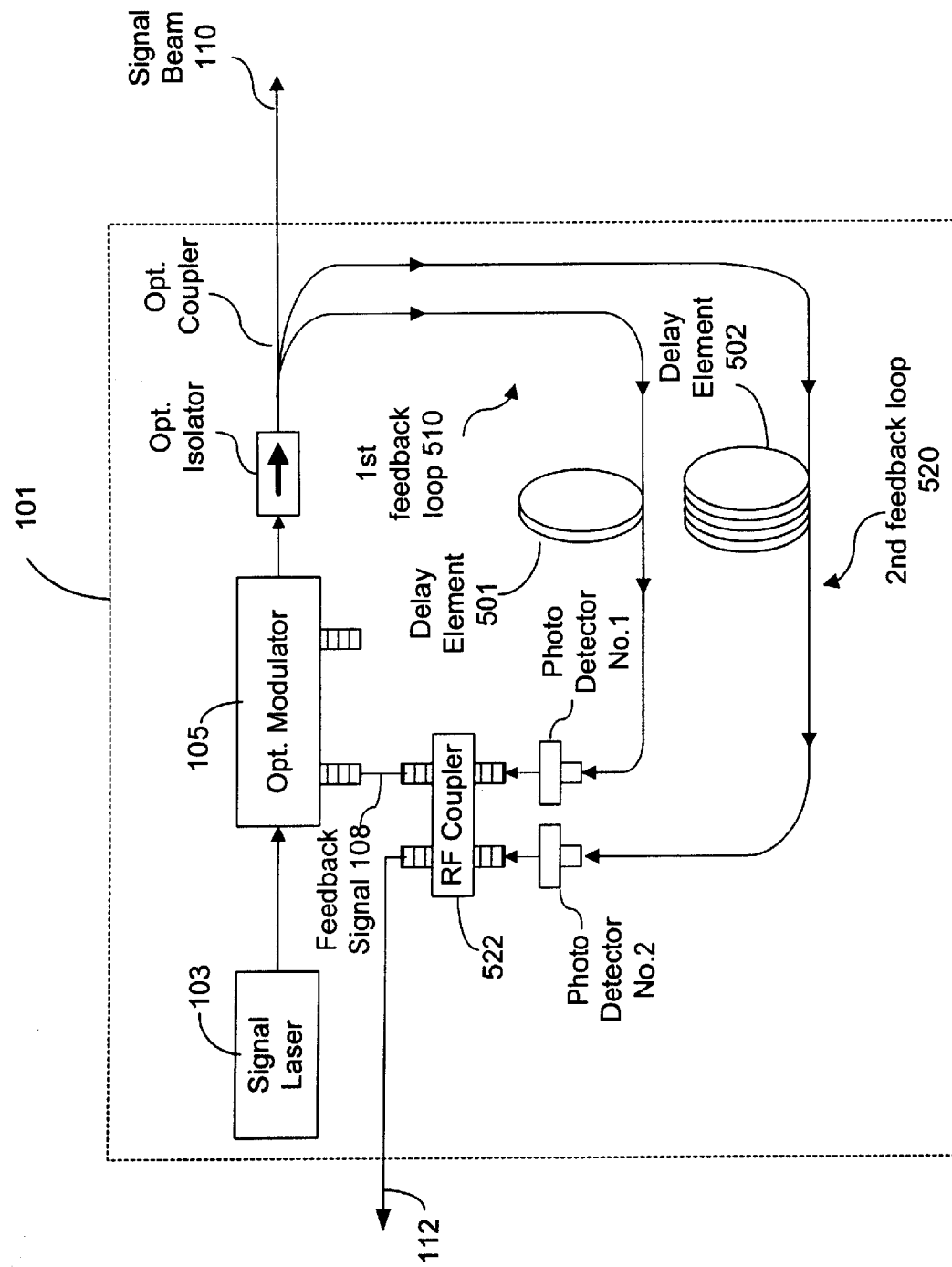
FIGS. 5A, 5B, and 5C show examples of opto-electronic oscillators that are suitable for use as a signal generator in the system of FIG. 1 for generating the signal beam and a RF control signal for modulating the pump beam.
Figure 5B:
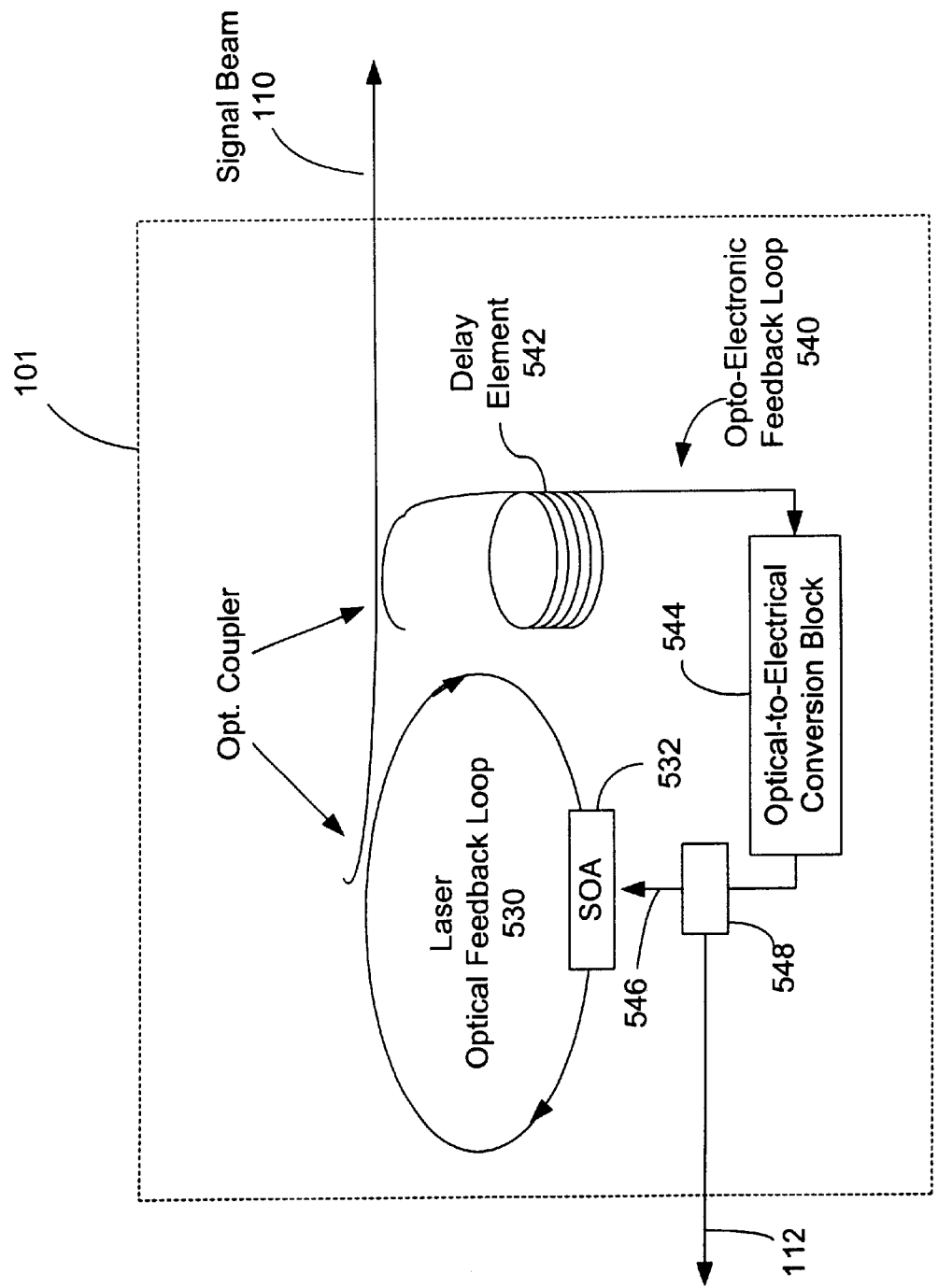

FIG. 5B shows a coupled OEO which directly couples a laser oscillation in an optical feedback loop 530 to an electrical oscillation in an opto-electronic feedback loop 540 which includes an optical portion with an optical delay element 542 and an electrical portion that includes an optical-to-electrical conversion block 544 (e.g., a photodetector). The optical gain of the optical feedback loop 530 is controllable by an electrical signal 546 from the opto-electronic loop 540, e.g., a semiconductor optical amplifier (SOA) 532 may be disposed in the optical loop 530. Here, the optical feedback loop 530 and the SOA 532 function as the signal laser 103 and the signal modulator 105 in FIG. 1. The signal 546 is equivalent to the RF control signal 108 in FIG. 1. A RF coupler 548 may be used to split a portion of the signal 546 as the control signal 112 for controlling the pump optical modulator 160.

Figure 5C:
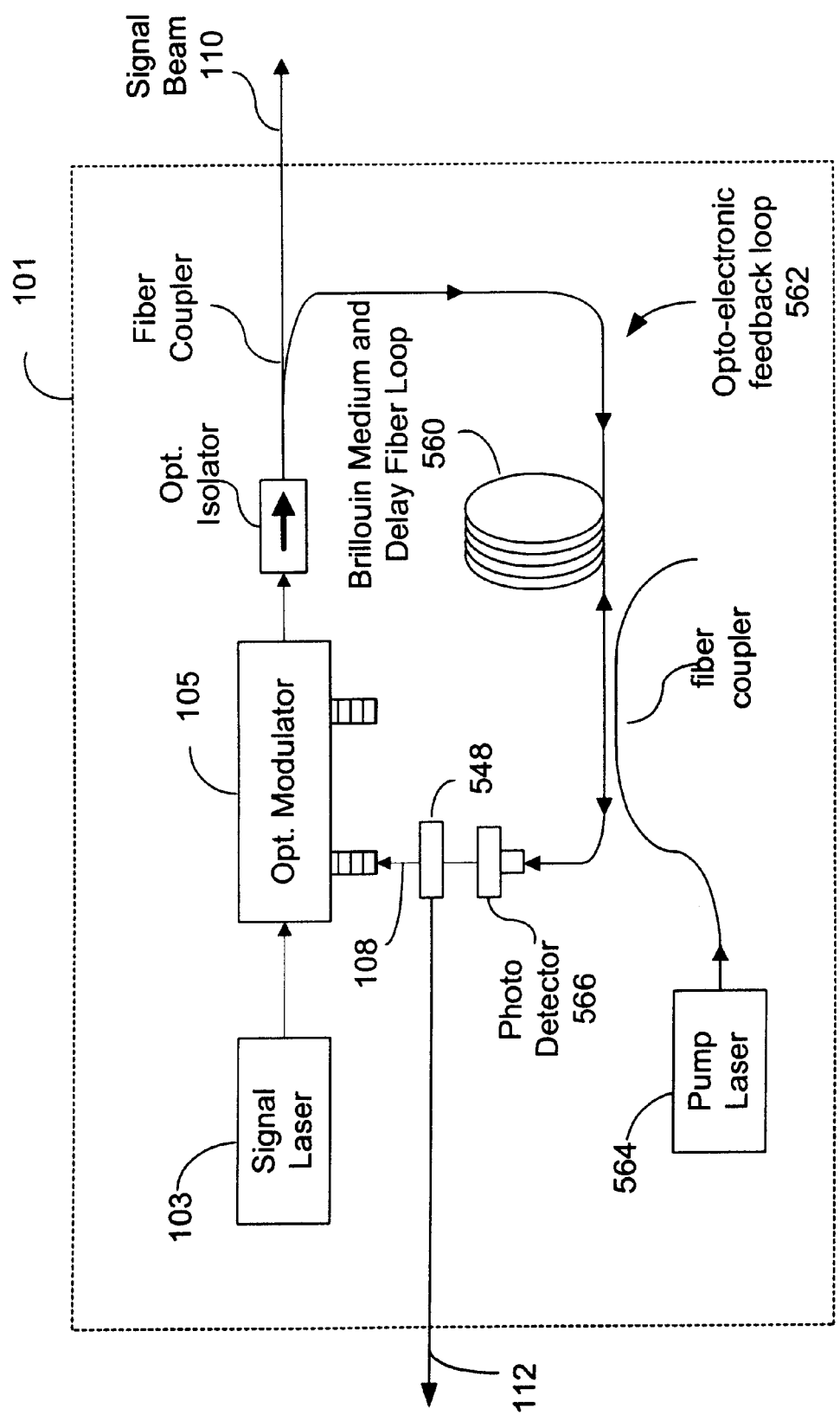

In addition, opto-electronic oscillators can also be implemented by having at least one active opto-electronic feedback loop that generates an electrical modulation signal based on the stimulated Brillouin scattering. FIG. 5C shows such a Brillouin OEO which includes a Brillouin optical medium 560 in an opto-electronic feedback loop 562 and uses the natural narrow linewidth of the Brillouin scattering to select a single oscillating mode. A pump laser 564 is used to generate a Brillouin pump beam in the Brillouin medium 560. A photodetector 566 converts the optical signal in the loop 562 into an electrical feedback signal equivalent to the RF signal 108. A RF coupler 548 may be used to split a portion of the detector output as the control signal 112 for controlling the pump optical modulator 160.

The above description only discloses a few embodiments. Other modifications and enhancements may be made. All these are intended to be encompassed by the following claims.

What is claimed is:

1. A device, comprising:
   a signal generator operable to produce a signal beam at a signal frequency;
   a pump generator operable to produce a pump beam at a pump frequency that is different from said signal frequency;
   a polarizing beam splitter positioned to receive said signal beam in a first linear polarization at a first port and said pump beam in a second linear polarization orthogonal to said first linear polarization at a second port to output said signal and said pump beams at a third port;
   an optical medium positioned to receive said signal beam and said pump beam from said polarizing beam splitter, said optical medium exhibiting a Brillouin effect in response to said pump beam to produce at least one Brillouin signal that propagates opposite to a direction of said pump beam; and
   a polarization-rotating reflector positioned to receive a transmitted optical beam from said optical medium and reflect said transmitted optical beam back to said optical medium after rotating a polarization of said transmitted optical beam by 90 degrees.

2. The device as in claim 1, wherein said signal generator is operable to modulate said signal beam to carry modulation signals in response to a modulation control signal, and wherein said pump generator is operable to modulate said pump beam to carry modulation pump signals in response to said modulation control signal, said modulation pump signals having a frequency spacing substantially equal to a frequency spacing of said modulation signals in said signal beam.

3. The device as in claim 2, wherein said pump generator includes a pump laser that is tunable in frequency and produces said pump beam, and an optical modulator to modulate said pump beam, said device further comprising:
   an optical detector positioned to receive a portion of an output optical signal from said second port of said polarizing beam splitter to produce a detector output signal;
   a circuit element coupled to receive said detector output signal and to produce a laser control signal; and
   a laser control unit, coupled to said circuit element and said pump laser and operable to tune said pump frequency of said pump laser according to said laser control signal.

4. The device as in claim 2, wherein said signal generator includes:
   a signal laser which produces said signal beam;
   a signal source which produces said modulation control signal; and
   a signal optical modulator positioned to receive and modulate said signal beam and coupled to receive said modulation control signal from said signal source.

5. The device as in claim 4, wherein said pump generator includes:
   a pump laser which produces said pump beam; and
   a pump optical modulator positioned to receive and modulate said pump beam and coupled to receive said modulation control signal from said signal source.

6. The device as in claim 4, comprising a laser control mechanism which includes:
   an optical coupler to split a monitor beam from an output optical signal from said optical medium;
   an optical monitor detector to convert said monitor beam into an electrical monitor signal; and
   a laser control unit coupled to said optical monitor detector to adjust one of said signal laser and said pump laser to maintain overlap of frequencies of said Brillouin signals with frequencies of selected modulation signals in said signal beam, respectively.

7. The device as in claim 6, wherein said laser control mechanism further includes a signal unit to separate DC and low frequency components of said electrical monitor signal to produce a laser control feedback signal, wherein said laser control unit receives and uses said laser control feedback signal to adjust said one of said signal laser and said pump laser.

8. The device as in claim 2, wherein said signal generator includes:

an active optical feedback loop to produce said signal beam with said modulation signals, wherein said active optical feedback loop having a gain modulator to control an optical gain for said active optical feedback loop in response to said modulation control signal;

an optical path to receive a fraction of said signal beam with said modulation signals;

an optical detector at an end of said optical path to convert said fraction of said signal beam into an electronic feedback signal; and an electrical path coupled to said optical detector to transmit said electronic feedback signal to produce said modulation control signal with a delay to produce an in-phase feedback to said gain modulator, wherein said gain modulator, said optical path, said optical detector, and said electrical path from a closed electronic-optical feedback loop that sustains an electromagnetic oscillation.

9. The device as in claim 8, wherein said gain modulator includes a semiconductor optical amplifier.

10. The device as in claim 1, wherein said signal generator includes:

a signal laser which produces said signal beam;

a signal optical modulator positioned to receive and modulate said signal beam to produce modulation signals in said signal beam in response to a modulation control signal; and a feedback loop having an optical portion that receives a portion of said signal beam output from said optical modulator, an optical delay element in said optical portion, and a photodetector converting said portion into a detector output signal, wherein said feedback loop is operable to produce said modulation control signal from said detector output signal.

11. A device, comprising:

a signal generator operable to produce a signal beam at a signal frequency and to modulate said signal beam to carry modulation signals in response to a modulation control signal;

a pump laser operable to produce a pump beam at a pump frequency that is different from said signal frequency;

a pump optical modulator positioned to receive said pump beam and operable to modulate said pump beam to carry modulation pump signals in response to said modulation control signal, said modulation pump signals having a frequency spacing substantially equal to a frequency spacing of said modulation signals in said signal beam; and an optical medium positioned to receive said signal beam and said pump beam, said optical medium exhibiting a Brillouin effect in response to said modulation pump signals in said pump beam to produce Brillouin signals that propagate opposite to a direction of said pump beam, wherein said Brillouin signals propagate in the same direction as said signal beam and respectively overlap with selected modulation signals in said signal beam in frequency to amplify said selected modulation signals.

12. The device as in claim 11, further comprising:

a polarizing beam splitter positioned to receive said signal beam from said signal generator in a first linear polarization and said pump beam from said pump optical modulator in a second linear polarization that is orthogonal to said first linear polarization, said polarizing beam splitter operable to output said signal and said pump beams in the same direction into said optical medium; and a polarization-rotating reflector positioned to receive a transmitted optical beam from said optical medium and reflect said transmitted optical beam back to said optical medium after rotating a polarization of said transmitted optical beam by 90 degrees.

13. The device as in claim 11, further comprising:

an optical detector positioned to receive a portion of an output optical signal from said optical medium that includes said amplified selected modulation signals to produce a detector output signal;

a circuit element coupled to receive said detector output signal and to produce a laser control signal; and a laser control unit, coupled to said circuit element and said pump laser and operable to tune said pump frequency of said pump laser according to said laser control signal.

14. The device as in claim 11, wherein said signal generator includes:

a signal laser which produces said signal beam; a signal source which produces said modulation control signal; and a signal optical modulator positioned to receive and modulate said signal beam and coupled to receive said modulation control signal from said signal source.

15. The device as in claim 14, comprising a laser control mechanism which includes:

an optical coupler to split a monitor beam from an output optical signal from said optical medium;

an optical monitor detector to convert said monitor beam into an electrical monitor signal; and a laser control unit coupled to said optical monitor detector to adjust one of said signal laser and said pump laser to maintain said overlap of said frequencies of said Brillouin signals with said frequencies of said selected modulation signals in said signal beam, respectively.

16. The device as in claim 15, wherein said laser control mechanism further includes a signal unit to separate DC and low frequency components of said electrical monitor signal to produce a laser control feedback signal, wherein said laser control unit receives and uses said laser control feedback signal to adjust said one of said signal laser and said pump laser.

17. The device as in claim 11, wherein said signal generator includes:

a signal laser which produces said signal beam;

a signal optical modulator positioned to receive and modulate said signal beam to produce said modulation signals in said signal beam; and a feedback loop having an optical portion that receives a portion of said signal beam output from said optical modulator, an optical delay element in said optical portion, and a photodetector converting said portion into a detector output signal, wherein said feedback loop is operable to produce said modulation control signal from said detector output signal.

18. The device as in claim 11, wherein said signal generator includes:

an active optical feedback loop to produce said signal beam with said modulation signals, wherein said active optical feedback loop having a gain modulator to control an optical gain for said active optical feedback loop in response to said modulation control signal;

an optical path to receive a fraction of said signal beam with said modulation signals;

an optical detector at an end of said optical path to convert said fraction of said signal beam into an electronic feedback signal; and an electrical path coupled to said optical detector to transmit said electronic feedback signal to produce said modulation control signal with a delay to produce an in-phase feedback to said gain modulator, wherein said gain modulator, said optical path, said optical detector, and said electrical path form a closed electronic-optical feedback loop that sustains an electromagnetic oscillation.

19. The device as in claim 18, wherein said gain modulator includes a semiconductor optical amplifier.

20. A method, comprising:

providing an optical medium that exhibits a Brillouin effect;

coupling a pump beam into said optical medium from a first side of said optical medium along a first direction to produce at least one Brillouin signal that propagates against said first direction;

controlling said pump beam to have a first linear polarization when entering said optical medium;

coupling a signal beam into said optical medium from said first side along said first direction;

controlling said pump beam to have second linear polarization orthogonal to said first linear polarization when entering said optical medium;

reflecting said signal and said pump beams that transmit through said optical medium from a second side that is opposite to said first side; and rotating a polarization of each of said signal and said pump beams by 90 degrees upon said reflection.

21. The method as in claim 20, further comprising modulating said signal and said pump beams according to a common modulation control signal before coupling said signal and said pump beams into said optical medium.

22. The method as in claim 21, wherein said modulation includes a modulation of a phase of said signal beam or said pump beam.

23. The method as in claim 21, wherein said modulation includes a modulation of an amplitude of said signal beam or said pump beam.

24. A method, comprising:

producing a signal beam at a signal frequency and a pump beam at a pump frequency that is different from said signal frequency;

using a common modulation control signal to modulate said signal beam to carry modulation signals and said pump beam to carry modulation pump signals, wherein a frequency spacing between two adjacent modulation pump signals is substantially equal to a frequency spacing of said modulation signals in said signal beam;

coupling said pump beam into an optical medium which exhibits a Brillouin effect in response to said modulation pump signals to produce Brillouin signals that propagate opposite to a direction of said pump beam;

coupling said signal beam into said optical medium to spatially overlap with said Brillouin signals and to propagate in the same direction of said Brillouin signals; and adjusting a frequency spacing between said signal frequency and said pump frequency to overlap frequencies of said Brillouin signals with frequencies of selected modulation signals in said signal beam to amplify said selected modulation signals.

25. The method as in claim 24, further comprising:

controlling said pump beam to have a first linear polarization when entering said optical medium from a first side of said optical medium;

controlling said signal beam to have a second linear polarization orthogonal to said first linear polarization and to enter said optical medium from said first side; and reflecting any optical signal that transmits through said optical medium from said first side of said optical medium through a second, opposite side of said optical medium, to propagate back to said optical medium as a reflected optical signal; and rotating a polarization of said reflected optical signal by 90 degrees upon reflection.

26. The method as in claim 24, wherein said signal beam with said modulation signals is produced by using an optical modulator to modulate a laser signal beam to produce said signal beam, and wherein said pump beam with said modulation pump signals is produced by:

converting a fraction of said signal beam with said modulation signals into an electronic feedback signal;

producing a delay in said electronic feedback signal;

using said electronic feedback signal with said delay to control said optical modulator to modulate said signal beam to form a closed electronic-optical loop that sustains an oscillation;

splitting a portion of said electronic feedback signal to control a pump optical modulator; and using said pump optical modulator to produce said modulation pump signals in said pump beam.

27. The method as in claim 26, wherein said delay is caused by an optical delay device in an optical path of said fraction of said signal beam prior to said conversion.

28. The method as in claim 24, further comprising:

controlling said pump beam to have a first polarization when entering said optical medium from a first side of said optical medium;

controlling said signal beam to have a second polarization orthogonal to said first polarization and to enter said optical medium from said first side; and reflecting any transmitted light that transmits through said optical medium from said first side of said optical medium through a second, opposite side of said optical medium, to propagate back to said optical medium as reflected light; and upon said reflection, making a polarization of said reflected light to be orthogonal to a polarization of said transmitted light prior to said reflection.

29. The method as in claim 24, further comprising:

using a signal laser to produce said signal beam;

using a separate pump laser to produce signal pump beam; and adjusting one of said signal laser and said pump laser to maintain said overlap of said frequencies of said Brillouin signals with said frequencies of said selected modulation signals in said signal beam, respectively.

30. The method as in claim 29, further comprising:

splitting a monitor beam from an output optical signal from said optical medium;

converting said monitor beam into an electrical monitor signal; and using information in DC and low frequency components of said electrical monitor signal to adjust said one of said signal laser and said pump laser.

31. A device, comprising:

a signal laser to produce a signal beam at a signal frequency;

a signal optical modulator to modulate said signal beam to carry modulation signals in response to a laser modulation control signal;

a modulation control module to produce said laser modulation control signal;

a pump laser to produce a pump beam at a pump frequency different from said signal frequency;

a pump optical modulator to modulate said pump beam to carry modulation pump signals in response to said laser modulation control signal, wherein said modulation pump signals have a frequency spacing substantially equal to a frequency spacing of said modulation signals in said signal beam;

an optical medium positioned to receive said pump beam in a first polarization from said pump optical modulator and said signal beam from said signal optical modulator in a second polarization orthogonal to said first polarization, said optical medium exhibiting a Brillouin effect in response to said modulation pump signals in said pump beam to produce Brillouin signals that propagate opposite to a direction of said pump beam and overlap with frequencies of selected modulation signals in said signal beam; and an optical polarization-changing reflector module optically coupled to receive transmitted light from said optical medium and to reflect said transmitted light back to said optical medium as reflected light with a polarization orthogonal to a polarization of said transmitted light.

32. The device as in claim 31, further comprising an output module to output light output from said optical medium in a direction along a direction from said optical reflector module to said optical medium.

33. The device as in claim 33, wherein said output module includes an optical circulator.

34. The device as in claim 31, wherein said modulation control module includes a RF driver to produce said laser modulation control signal at a RF modulation frequency.

35. The device as in claim 31, wherein said modulation control module includes:

an optical path to receive a fraction of said signal beam with said modulation signals;

an optical detector at an end of said optical path to convert said fraction of said signal beam into an electronic feedback signal; and an electrical path coupled to said optical detector to transmit said electronic feedback signal to produce said laser modulation control signal with a delay to produce an in-phase feedback to said signal optical modulator, wherein said signal optical modulator, said optical path, said optical detector, and said electrical path form a closed electronic-optical feedback loop that sustains an electromagnetic oscillation.

36. The device as in claim 35, wherein said modulation control module includes an optical delay element in said optical path to cause a portion of said delay.

37. The device as in claim 35, wherein said optical path includes a second Brillouin optical medium, and wherein said modulation control module includes:

a second pump laser to produce a second pump beam; and an optical coupler to couple said pump into said second Brillouin optical medium in a direction opposite to said fraction of said signal beam to amplify said fraction of said signal beam in a selected mode.

38. The device as in claim 31, wherein said optical polarization-changing reflector module include a Faraday rotator and a reflector.

39. The device as in claim 38, wherein said laser control mechanism further includes a signal unit to separate DC and low frequency components of said electrical monitor signal to produce a laser control feedback signal, wherein said laser control unit receives and uses said laser control feedback signal to adjust said one of said signal laser and said pump laser.

40. The device as in claim 31, further comprising a laser control mechanism which includes:

an optical coupler to split a monitor beam from an output optical signal from said optical medium;

an optical monitor detector to convert said monitor beam into an electrical monitor signal; and a laser control unit coupled to said optical monitor detector to adjust one of said signal laser and said pump laser to maintain said overlap of said frequencies of said Brillouin signals with said frequencies of said selected modulation signals in said signal beam.

* * * * *